United States Patent
Flynn et al.

(10) Patent No.: US 10,492,206 B2
(45) Date of Patent: Nov. 26, 2019

(54) COEXISTENCE OF COLLOCATED RADIOS

(71) Applicant: Apple Inc., Cupertino, CA (US)

(72) Inventors: Paul V. Flynn, Menlo Park, CA (US); Vijay Venkataraman, San Jose, CA (US); Artiom Shamis, San Jose, CA (US); Ofer Levy, Yehud (IL); Veerendra Boodannavar, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/826,260

(22) Filed: Nov. 29, 2017

(65) Prior Publication Data
US 2018/0352554 A1  Dec. 6, 2018

Related U.S. Application Data

(60) Provisional application No. 62/514,757, filed on Jun. 2, 2017.

(51) Int. Cl.
| | |
|---|---|
| *H04W 72/08* | (2009.01) |
| *H04W 52/24* | (2009.01) |
| *H04W 72/12* | (2009.01) |
| *H04W 88/06* | (2009.01) |
| *H04W 84/12* | (2009.01) |

(52) U.S. Cl.
CPC ....... *H04W 72/082* (2013.01); *H04W 52/243* (2013.01); *H04W 72/1215* (2013.01); *H04W 88/06* (2013.01); *H04W 84/12* (2013.01)

(58) Field of Classification Search
CPC .......................... H04W 72/082; H04W 52/243
See application file for complete search history.

(56) References Cited

U.S. PATENT DOCUMENTS

| | | | |
|---|---|---|---|
| 8,019,883 B1* | 9/2011 | Margulis | G06F 15/16 |
| 8,972,760 B1* | 3/2015 | Zajac | G06F 1/3212 |
| 9,197,332 B2 | 11/2015 | Desai et al. | |
| 2007/0129045 A1* | 6/2007 | Aerrabotu | H04M 1/16 |
| 2012/0329515 A1 | 12/2012 | Husted et al. | |

(Continued)

FOREIGN PATENT DOCUMENTS

| | | |
|---|---|---|
| EP | 2712255 | 3/2014 |
| WO | WO 2012/019564 | 2/2012 |

OTHER PUBLICATIONS

Extended European Search Report from European Patent Application No. 18175147.0, dated Oct. 9, 2018, 9 pages.

*Primary Examiner* — Ronald B Abelson
(74) *Attorney, Agent, or Firm* — Morgan, Lewis & Bockius LLP

(57) ABSTRACT

A device implementing a system for coexistence of collocated radios may include a first radio circuit configured to receive, from a collocated second radio circuit, a start indication for cellular activity associated with a radio resource control connection. The first radio circuit may be configured to, responsive to receiving the start indication, stop a wireless transmission capability. The first radio circuit may be configured to receive, from the collocated cellular circuit, an end indication for the cellular activity prior to the radio resource control connection being released. The first radio circuit may be configured to resume the wireless transmission capability in accordance with a reduced power level response to receiving the end indication.

19 Claims, 7 Drawing Sheets

(56) References Cited

U.S. PATENT DOCUMENTS

| | | | |
|---|---|---|---|
| 2013/0308597 A1* | 11/2013 | Murphy | H04W 36/18 |
| 2014/0273910 A1* | 9/2014 | Ballantyne | H04W 4/22 |
| 2016/0165065 A1* | 6/2016 | Damstra | H04M 15/07 |
| 2016/0174280 A1 | 6/2016 | Singh et al. | |

* cited by examiner

| SCENARIO | RRC_C BIT (502) | SHORT BIT (508) | EVENT REPORTED TO COEX MANAGER | WI-FI FW ACTION | WI-FI MANAGER ACTION |
|---|---|---|---|---|---|
| INITIATE CELLULAR SIGNALING PROCEDURE (602A) | 1 | 1 | CONNECTION_STATE = CONNECTED = 1 CONNECTION_TRIGGER = SHORT_START = 0 | BLANK PA TO STOP CURRENT FRAME, BLOCK TRANSMISSION OF FUTURE DATA FRAMES, THEN UNBLANK PA, SEND NULL FRAME WITH PM=1, NOTIFY WI-FI MANAGER OF A SHORT CONNECTION | DOES NOT REPORT LINK DOWN TO UPPER LAYERS, ALLOW REQUESTS FOR ACTIVE SCANS FROM LOCATION, REQUEST DRIVER TO DISCARD PACKETS |
| END CELLULAR SIGNALING PROCEDURE (602B) | 0 | 1 | CONNECTION_STATE = CONNECTED = 1 CONNECTION_TRIGGER = SHORT_END = 1 | EXIT POWER SAVE WITH AP, RESUME TRANSMISSIONS AT CAPPED POWER, NOTIFY WI-FI MANAGER | NOTIFY DRIVER TO NO LONGER DISCARD PACKETS, RE-ASSOCIATE IF NEEDED |
| USER PLANE ACTIVITY OCCURS BEFORE THE RRC CONNECTION IS RELEASED (602C) | 1 | 0 | CONNECTION_STATE = CONNECTED = 1 CONNECTION_TRIGGER = LONG_START = 2 | BLANK PA TO STOP CURRENT FRAME, BLOCK TRANSMISSION OF FUTURE DATA FRAMES, THEN UNBLANK PA, SEND NULL FRAME WITH PM=1, NOTIFY WI-FI MANAGER OF A LONG CONNECTION, MAKE BEST EFFORT TO KEEP UP ASSOCIATION WITH AP WITHIN LIMIT OF 5% DUTY CYCLE | DOES NOT REPORT LINK DOWN TO UPPER LAYERS, ALLOW REQUESTS FOR ACTIVE SCANS FROM LOCATION, REQUEST DRIVER TO DISCARD PACKETS |
| RRC CONNECTION RELEASED (602D) | 0 | 0 | CONNECTION_STATE = CONNECTED = 0 CONNECTION_TRIGGER = MAX = 4 | RESUME TRANSMISSION AT NORMAL POWER, NOTIFY WI-FI MANAGER | NOTIFY DRIVER TO NO LONGER DISCARD PACKETS, RE-ASSOCIATE IF NEEDED |

*FIG. 6*

COEXISTENCE OF COLLOCATED RADIOS

CROSS-REFERENCE TO RELATED APPLICATIONS

The present application claims the benefit of U.S. Provisional Patent Application Ser. No. 62/514,757, entitled "Coexistence of Collocated Radios," filed on Jun. 2, 2017, which is hereby incorporated by reference in its entirety for all purposes.

TECHNICAL FIELD

The present description relates generally to coexistence of collocated radios, including coexistence of collocated Wi-Fi and cellular radios, such as for satisfying mobile device power supply constraints and/or mitigating interference.

BACKGROUND

Mobile devices may include multiple collocated wireless radios, such as cellular radios, Wi-Fi radios, Bluetooth radios, etc., that may interfere with each one another when used concurrently. For example, the third harmonic of an 800 MHz cellular communication may interfere with 2.4 GHz Wi-Fi communications, and cellular communications in bands 40 (2.3 GHz) and 41 (2.5 GHz) may cause out-of-band interference with respect to 2.4 GHz Wi-Fi and/or Bluetooth communications.

BRIEF DESCRIPTION OF THE DRAWINGS

Certain features of the subject technology are set forth in the appended claims. However, for purpose of explanation, several embodiments of the subject technology are set forth in the following figures.

FIG. 6 illustrates a table listing different cellular states when coexistence messages are communicated in accordance with one or more implementations.

DETAILED DESCRIPTION

Figure 1:
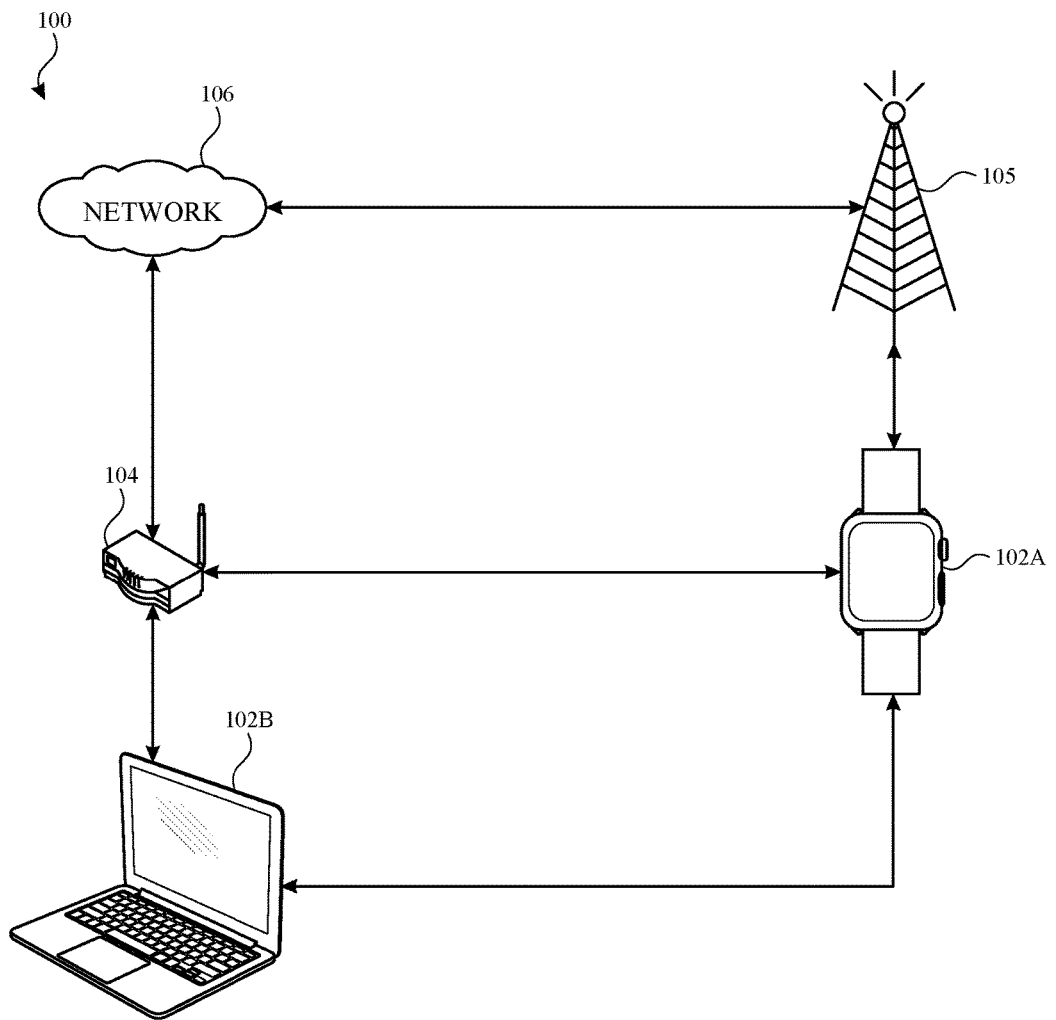
FIG. 1 illustrates an example network environment in which a system for coexistence of collocated radios may be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In addition to frequency interference, the concurrent use of multiple radios collocated within a mobile device may cause a strain on the power supply of the mobile device, and/or may increase the specific absorption rate (SAR) associated with the mobile device. In the instance of a device having a relatively small battery, such as a watch, prolonged concurrent transmissions by multiple radios, such as cellular and Wi-Fi, may cause an overdraw of the power supply that may prevent one or more components of the mobile device from receiving sufficient power to operate properly, which in turn may cause the mobile device (or an aspect thereof) to malfunction. Thus, in addition to providing coexistence mechanisms to mitigate interference between collocated radios, a system for coexistence of collocated radios may also need to provide coexistence mechanisms to control the power consumption and/or SAR associated with simultaneous transmissions by collocated radios.

In the subject system for coexistence of collocated radios, coexistence mechanisms are provided that not only prevent interference between communications of collocated radios but also prevent an overdraw of a mobile device's power supply (and/or output of power in excess of a SAR threshold) due to concurrent transmissions by multiple collocated radios without adversely affecting a user's experience using the mobile device. For example, a cellular radio may provide a collocated Wi-Fi radio with an indication of when cellular activity begins. Responsive to receiving the indication, the Wi-Fi radio may temporarily blank its power amplifier to immediately stop any in-progress Wi-Fi transmissions, thereby preventing an overdraw on the power supply and/or emissions in excess of a SAR limit, threshold, standard, etc. The Wi-Fi radio (e.g. in conjunction with a Wi-Fi manager operating on the host processor) may then discard subsequent packets and may implement one or more mechanisms to maintain association with a corresponding Wi-Fi access point while the packets are being discarded.

The cellular radio may subsequently provide the collocated Wi-Fi radio with an indication of when the cellular activity has ended, e.g. before the radio resource control connection for the cellular activity has been released. The Wi-Fi radio may then resume Wi-Fi transmissions, e.g., at a capped power level. A restraint on Wi-Fi transmissions may be implemented at least for a transitional period, e.g., in case the cellular activity begins again before the radio resource control connection is released. When the radio resource control connection is released, the cellular radio may provide the Wi-Fi radio with an indication that the radio resource control connection has been released, and the Wi-Fi radio may then resume transmissions in accordance with the normal power level(s). Thus, the subject system reduces the amount of time that the Wi-Fi radio is unable to transmit by allowing the Wi-Fi radio to resume transmissions, e.g., at a capped power level, prior to the release of the radio resource connection for the cellular activity. In addition, the subject system can prevent an overdraw on the power supply (and/or output of power in excess of SAR limits) by allowing the Wi-Fi radio to transmit only at a capped power level until the radio resource control connection has been released.

FIG. 1 illustrates an example network environment 100 in which a system for coexistence of collocated radios may be realized in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-B, a Wi-Fi access point 104, a cellular base station 105, and a network 106. In one or more implementations, the network 106 may be an interconnected network of devices that may include, or may be communicatively coupled to, the Internet. One or more of the electronic devices 102A-B may connect to the network 106 through the Wi-Fi access point 104 and/or through the cellular base station 105.

The electronic devices 102A-B may be computing devices, such as laptop or desktop computers, smartphones, set-top boxes, peripheral devices (e.g., watches, digital cameras, speakers), user input devices, tablets, wearable devices, or other appropriate devices that include wireless network interfaces, such as Wi-Fi radios, cellular radios, Bluetooth radios, and/or other wireless radios. In FIG. 1, by way of example, the electronic device 102A is depicted as a smartwatch and the electronic device 102B is depicted as a laptop computer. One or more of the electronic devices 102A-B may be, and/or may include all or part of, the electronic device discussed below with respect to FIG. 2 and/or the electronic system discussed below with respect to FIG. 7.

One or more of the electronic devices 102A-B may include appropriate wireless network interfaces for establishing direct, e.g. peer-to-peer, wireless network connections, such as Wi-Fi Direct connections, Apple wireless direct link (AWDL) connections, Bluetooth connections, or generally any wireless network connections that may be used to perform a signal exchange, as well as Wi-Fi network connections, such as infrastructure basic service set (BSS) connections with the Wi-Fi access point 104, and cellular network connections, such as with the cellular base station 105.

The subject system allows the electronic devices 102A-B to control the concurrent usage of multiple radios, such as to prevent an overdraw on the power supply, to prevent excessive SAR, and/or to mitigate interference. For example, when the electronic device 102A initiates a voice call using the cellular radio, the cellular radio may inform the Wi-Fi radio of the cellular activity and the Wi-Fi radio may immediately blank its power amplifier (or otherwise terminate transmission) to minimize or reduce any concurrent transmissions between the Wi-Fi and cellular radios. In one or more implementations, blanking may refer to powering off the power amplifier, or otherwise preventing the power amplifier from operating. Additionally or alternatively, one or more other mechanisms for terminating Wi-Fi transmission may be implemented.

The Wi-Fi radio may prevent any further Wi-Fi transmissions until the cellular radio informs the Wi-Fi radio that the cellular activity has completed (e.g. before the radio resource control connection has been released for the cellular activity). Upon notification from the cellular radio that cellular activity has terminated, the Wi-Fi radio may resume Wi-Fi transmissions, e.g., at a capped power level until the cellular radio informs the Wi-Fi radio that the radio resource control connection has been released. Once the cellular radio informs the Wi-Fi radio that the radio resource control connection has been released, the Wi-Fi radio may resume transmissions in accordance with normal power level(s) and/or operational parameter(s). In one or more implementations, the normal power level(s) may refer to the power level(s) that can be achieved within a given SAR threshold (e.g., as indicated by one or more regulatory bodies) in the absence of the cellular radio activity. An example process of a Wi-Fi radio in the subject system for coexistence of collocated radios is discussed further below with respect to FIG. 3.

In one or more implementations, the Bluetooth radio of the electronic device 102A may operate in a capped power mode while the voice call is occurring over the cellular radio, such as to prevent an overdraw on the power supply and/or to prevent combined output power in excess of a SAR limit (or threshold). Furthermore, the Bluetooth radio of the electronic device 102A may support clock alignment with the cellular radio, such as to avoid radio frequency (RF) degradation of Bluetooth signals when the cellular radio is utilizing one or more bands, such as bands 40 and/or 41, other bands near 2.4 GHz, and/or bands that can have harmonics that interfere with transmissions at/near 2.4 GHz.

In one or more implementations, the electronic devices 102A-B, may perform a Wi-Fi time of flight (ToF) signal exchange with one another to perform one or more ranging operations, such as to measure a ToF between the electronic devices 102A-B in order to determine (or estimate) the distance (e.g., line of sight distance) between the electronic devices 102A-B. In some other implementations, the ToF exchange may be performed using another radio frequency resource, such as ultra wideband (UWB), but the operations can be implemented as described. The line of sight distance estimation obtained from the one or more ranging operations may be used by one or more of the electronic devices 102A-B, for example, to determine whether to perform one or more tasks. In one or more implementations, the electronic device 102B (laptop computer) may unlock an operating system running on the electronic device 102B and/or access to one or more resources when the electronic device 102B estimates (using the subject system) that the electronic device 102A (smartwatch) is within a threshold distance of the electronic device 102B, such as tens of centimeters, a meter, etc.

The Wi-Fi ToF signal exchange may involve precise timing measurements with respect to the transmission and reception of predetermined waveforms that may be particularly susceptible to interference. Thus, the Wi-Fi radio of one or more of the electronic devices 102A-B, such as the electronic device 102A, may notify a collocated cellular radio that a priority reception (and/or transmission), such as a ToF signal exchange, is about to begin. The cellular radio, responsive to the notification, may then blank its power amplifier to minimize or reduce any transmissions that may interfere with the Wi-Fi radio's reception (and/or transmission). The Wi-Fi radio may subsequently notify the cellular radio when the priority reception (and/or transmission) has completed and the cellular radio may resume operation, e.g., by unblanking its power amplifier. An example process of a cellular radio in the subject system for coexistence of collocated radios is discussed further below with respect to FIG. 4.

In order for the Wi-Fi and cellular radios of the electronic devices 102A-B to quickly respond to one another, and thereby minimize concurrent transmissions, the radios may communicate with each other over a direct physical interface. The radios may communicate using coexistence signals and/or coexistence messages that include message payloads that indicate whether the respective radios should terminate operation, e.g., by blanking their respective power amplifiers. In some embodiments, the message payloads can be implanted as discussed further below with respect to FIG. 5. Additional scenarios involving the communication of coexistence messages are discussed further below with respect to FIG. 6.

For explanatory purposes, the system for coexistence of collocated radios is discussed herein with reference to coexistence of Wi-Fi and cellular radios. However, the subject system is not limited to coexistence of Wi-Fi and cellular radios, and the subject system may be utilized to provide for coexistence of any other types of wireless radios, and for any number of wireless radios such as, for example, one or more Bluetooth radios, NFC radios, Zigbee radios, and the like.

Figure 2:
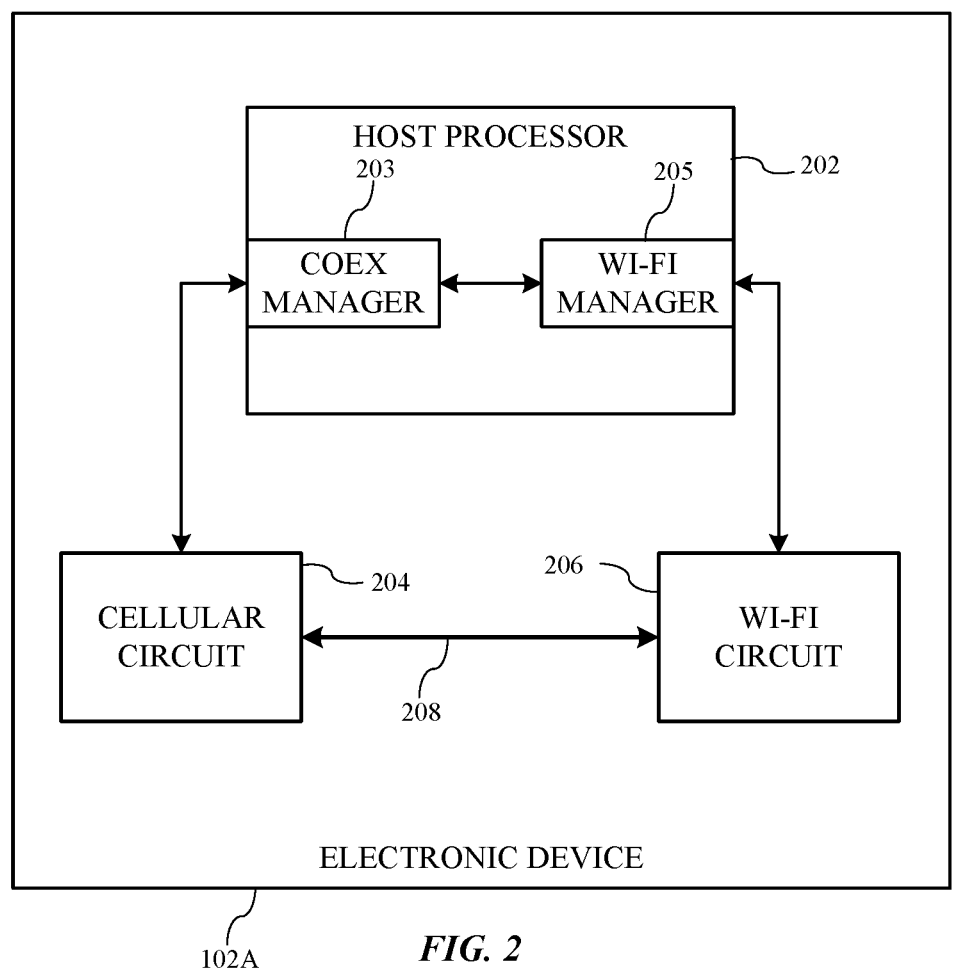
FIG. 2 illustrates an example electronic device that may implement a system for coexistence of collocated radios in accordance with one or more implementations.

FIG. 2 illustrates an example electronic device 102A that may implement a system for coexistence of collocated radios in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the example electronic device 102A may be implemented by the electronic device 102B.

The electronic device 102A includes a host processor 202, a cellular circuit 204, a Wi-Fi circuit 206, and an interface 208 that communicatively couples the cellular circuit 204 to the Wi-Fi circuit 206. The host processor 202 may implement, e.g. via software, a coexistence (coex) manager 203 and/or a Wi-Fi manager 205. The cellular circuit 204 may be and/or may include a cellular radio and the Wi-Fi circuit 206 may be and/or may include a Wi-Fi radio. In one or more implementations, the Wi-Fi circuit 206 may include and/or may implement one or more other radios, such as a Bluetooth radio. The cellular circuit 204 may execute cellular firmware to perform one or more cellular operations, and the Wi-Fi circuit may execute Wi-Fi firmware to perform one or more Wi-Fi operations.

For explanatory purposes, the electronic device 102A is illustrated as including a cellular circuit 204 and a Wi-Fi circuit 206; however, the electronic device 102A may include any other radio circuits in lieu of, and/or in addition to, one or more of the cellular circuit 204 and the Wi-Fi circuit 206. Thus, the circuits 204, 206 of the electronic device 102A may generally be referred to as a first radio circuit and a second radio circuit, respectively.

The cellular circuit 204 may provide for communication of signals in accordance with a variety of cellular communication standards, such LTE, WCDMA, and the like. The Wi-Fi circuit 206 may provide for communication of signals in accordance with one or more Wi-Fi standards, such as, for example, 802.11ac, 802.11ax, etc. The cellular circuit 204 and the Wi-Fi circuit 206 may be communicatively coupled via the interface 208. The interface 208 may be a physical interface and/or channel over which the circuits 204, 206 can transmit signals, including coexistence messages (and/or signals), to each other, such as coexistence messages having one of the payload formats that are discussed below with respect to FIG. 5. In one or more implementations, the interface 208 may be, and/or may support, a wireless coexistence interface (e.g., WCI-2).

The host processor 202 may include suitable logic, circuitry, and/or code that enable processing data and/or controlling operations of the electronic device 102A. In this regard, the host processor 202 may be enabled to provide control signals to various other components of the electronic device 102A. The host processor 202 may also control transfers of data between various portions of the electronic device 102A. Additionally, the host processor 202 may enable implementation of an operating system or otherwise execute code to manage operations of the electronic device 102A.

The host processor 202 may implement, such as via software, a coex manager 203 and/or a Wi-Fi manager 205 to facilitate providing for coexistence between the cellular circuit 204 and the Wi-Fi circuit 206. In one or more implementations, the host processor 202 may provide a communication channel between the cellular circuit 204 and the Wi-Fi circuit 206. Either of the circuits 204, 206 may fall back to the communication channel through the host processor 202 when a response to a query is not received over the interface 208. For example, the cellular circuit 204 may be asleep during a radio resource control connected state and therefore may not respond to a query from the Wi-Fi circuit 206.

In one or more implementations, one or more of the host processor 202, the cellular circuit 204, the Wi-Fi circuit 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination thereof.

Figure 3:
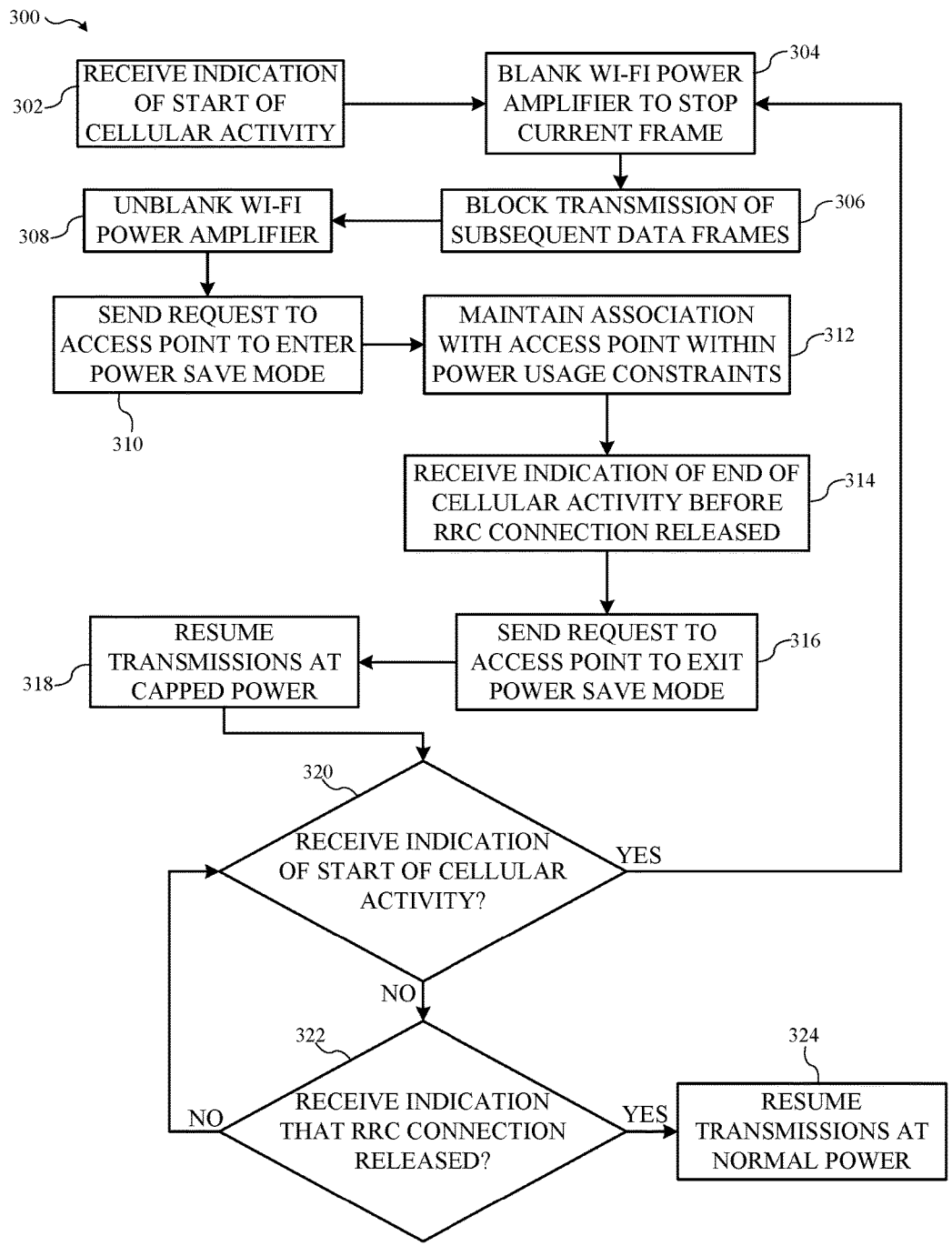
FIG. 3 illustrates a flow diagram of an example process of a Wi-Fi circuit in a system for coexistence of collocated radios in accordance with one or more implementations.

FIG. 3 illustrates a flow diagram of an example process 300 that can be implemented by a Wi-Fi circuit 206 in a system for coexistence of collocated radios in accordance with one or more implementations. For explanatory purposes, the process 300 is primarily described herein with reference to the Wi-Fi circuit 206 of the electronic device 102A of FIGS. 1 and 2. However, the process 300 is not limited to the Wi-Fi circuit 206 of the electronic device 102A of FIGS. 1 and 2, and one or more blocks (or operations) of the process 300 may be performed by one or more other components of the electronic device 102A, such as the cellular circuit 204 and/or the host processor 202 of the electronic device 102A. The electronic device 102A also is presented as an exemplary device and the operations described herein may be performed by any suitable device, such as the electronic device 102B. Further, for explanatory purposes, the blocks of the process 300 are described herein as occurring in serial, or linearly. However, two or more blocks of the process 300 may occur in parallel. In addition, the blocks of the process 300 need not be performed in the order shown and/or one or more blocks of the process 300 need not be performed and/or can be replaced by one or more other operations. One or more additional operations also can be performed.

In the process 300, the Wi-Fi circuit 206 receives an indication of a start of cellular activity from the cellular circuit 204, such as over the interface 208 (302). For example, when the cellular circuit 204 determines that cellular activity is about to begin, such as when the cellular circuit establishes a radio resource control connection with the cellular base station 105, the cellular circuit 204 may transmit a coexistence message that indicates that cellular activity is starting. The coexistence message may further include a characterization of the estimated duration of the cellular activity, e.g., as short or long. For example, short cellular activity may refer to signaling procedures that are typically initiated by the baseband/telephony rather than the user, such as tracking area updates, while long cellular activity may refer to voice calls, data connections, or long signaling procedures, such as IP multimedia subsystem (IMS) or attach signaling.

Responsive to receiving the indication of the start of the cellular activity (302), the Wi-Fi circuit 206 blanks, e.g., immediately or as soon as possible, its power amplifier to stop any frame in the process of being, and/or about to be, transmitted (304). Since the power amplifier is typically one of the last components in the transmit chain, blanking the power amplifier may allow for stopping data frames that are in the process of being transmitted, and/or about to be transmitted, from the PHY of the Wi-Fi circuit 206. After blanking the power amplifier (304), the Wi-Fi circuit 206 blocks or prevents the transmission of any subsequent data frames. For example, the Wi-Fi circuit 206 may notify the Wi-Fi manager 205 of the cellular activity, and the Wi-Fi manager 205 may request that the Wi-Fi driver discard one or more subsequent data packets. In one or more implementations, the Wi-Fi circuit 206 may further notify the Wi-Fi manager 205 of the characterization of the estimated duration of the cellular activity indicated by the cellular circuit 204, e.g., long or short. The Wi-Fi manager 205 may not report to the upper layers that the Wi-Fi link is down, such as to prevent the upper layers from attempting to form a data connection via the cellular circuit 204. Furthermore, the Wi-Fi circuit 206 may still receive Wi-Fi transmissions and provide the received Wi-Fi transmissions to the upper layers while the data packets to be transmitted are being discarded.

In one or more implementations, the Wi-Fi manager 205 may allow processing of requests for active scans or probe requests, e.g., for location/positioning applications, such as during voice calls, and the Wi-Fi manager 205 may allow processing of requests for passive scans, e.g. for location/positioning applications, such as during an emergency voice call. However, the Wi-Fi manager 205 may suspend Wi-Fi auto-join functionality until the radio resource control connection is released.

After blocking or preventing the transmission of data frames (306), the Wi-Fi circuit 206 unblanks the power amplifier (308) and sends a request to the Wi-Fi access point 104 to enter a power save mode (310). For example, the Wi-Fi circuit 206 may transmit a null frame and/or a frame with a power management bit (e.g. "PM") set to 1. In one or more implementations, the Wi-Fi circuit 206 may transmit an indication that it is about to enter a power save mode to the Wi-Fi access point 104, rather than transmitting a request. The Wi-Fi circuit 206 may then attempt to maintain an association with the Wi-Fi access point 104 while staying within power usage constraints, such as by transmitting acknowledgment (ACK/NACK) packets, keep alive messages, and the like (312). Since the cellular circuit 204 is engaging in the cellular activity, the Wi-Fi circuit 206 may be confined to predetermined power constraints to avoid causing an overdraw on the power supply, which may also be referred to as a brown-out. For example, the predetermined power constraints may be that the Wi-Fi circuit 206 can only transmit during a certain percentage of a duty cycle, such as 5% of a duty cycle over, e.g., a 100 millisecond window. Thus, if transmitting a particular acknowledgment packet or a keep alive message would cause the Wi-Fi circuit 206 to exceed its predetermined power constraints, the Wi-Fi circuit 206 may bypass performing the transmission.

The Wi-Fi circuit 206 receives an indication of the end of the cellular activity from the cellular circuit 204 over the interface 208, such as before the radio resource control connection with the base station 105 has been released (314). For example, the cellular circuit 204 may transmit a coexistence message over the interface 208 indicating that the cellular activity has ended. Responsive to receiving the indication that the cellular activity has ended (314), the Wi-Fi circuit 206 may transmit a request to the Wi-Fi access point 104 to exit the power save mode (316).

Responsive to receiving the indication of the end of the cellular activity from the cellular circuit 204, the Wi-Fi circuit 206 may resume Wi-Fi transmissions, e.g., at a capped power level (318). For example, the Wi-Fi circuit 206 may notify the Wi-Fi manager 205 that the cellular activity has completed and the Wi-Fi manager 205 may notify the Wi-Fi driver to stop discarding packets. Although the Wi-Fi circuit 206 may resume Wi-Fi transmissions, the power level of the transmissions may be capped, such as to prevent an overdraw on the power supply and/or outputting power in excess of a SAR threshold, e.g., if the cellular activity were to start again prior to the radio resource control connection being released.

If the Wi-Fi circuit 206 receives, from the cellular circuit 204, an indication that the cellular activity is starting again (320), the Wi-Fi circuit again blanks its power amplifier (304) and repeats (306)-(320). If the Wi-Fi circuit 206 receives, from the cellular circuit 204, an indication that the radio resource control connection (322) has been released, the Wi-Fi circuit 206 resumes transmissions in accordance with normal power level and/or operational parameters (324).

Figure 4:
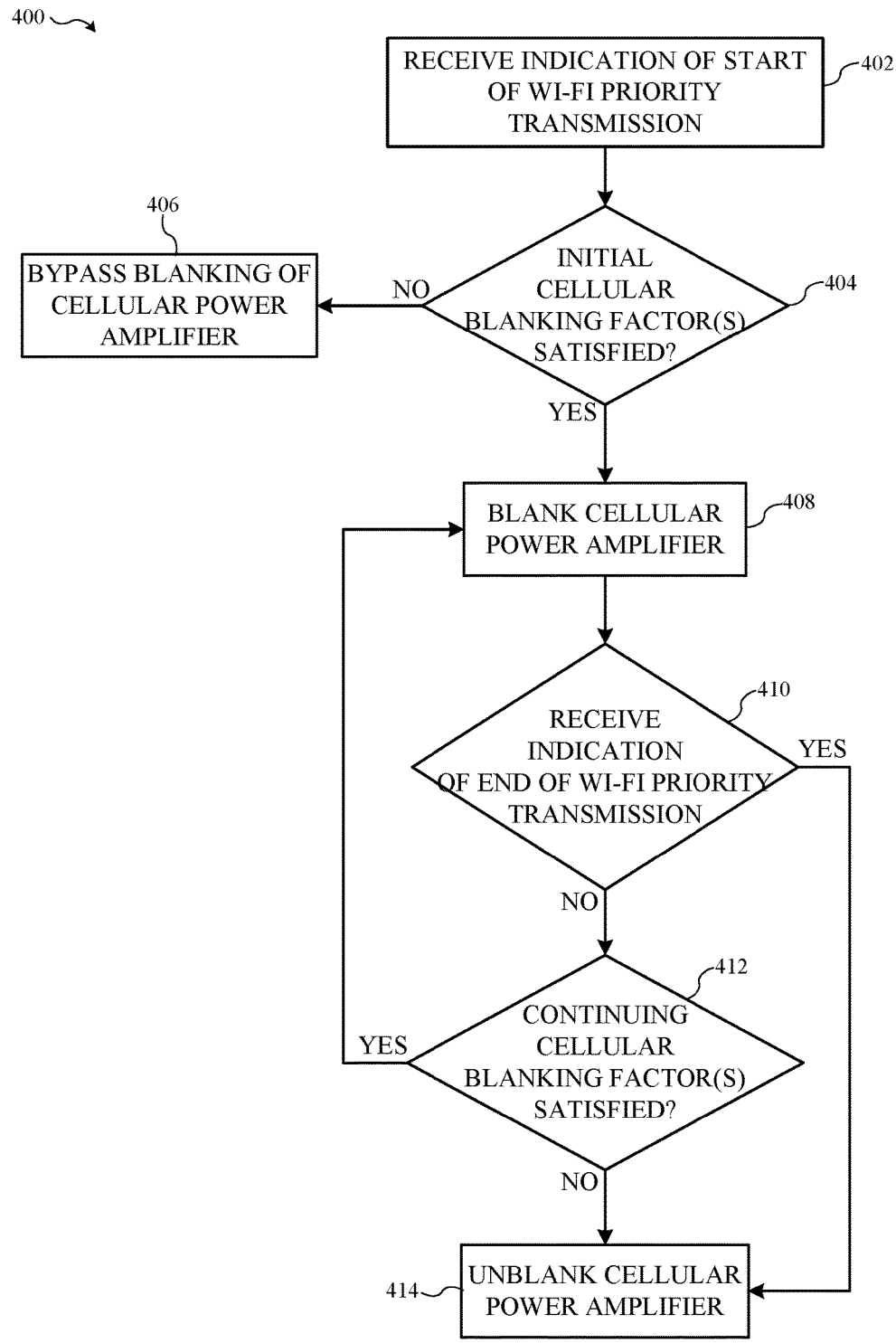
FIG. 4 illustrates a flow diagram of an example process of a cellular circuit in a system for coexistence of collocated radios in accordance with one or more implementations.

FIG. 4 illustrates a flow diagram of an example process 400 of a cellular circuit 204 in a system for coexistence of collocated radios in accordance with one or more implementations. For explanatory purposes, the process 400 is primarily described herein with reference to the cellular circuit 204 of the electronic device 102A of FIGS. 1 and 2. However, the process 400 is not limited to the cellular circuit 204 of the electronic device 102A of FIGS. 1 and 2, and one or more blocks (or operations) of the process 400 may be performed by one or more other components of the electronic device 102A, such as the Wi-Fi circuit 206 and/or the host processor 202 of the electronic device 102A. The electronic device 102A also is presented as an exemplary device and the operations described herein may be performed by any suitable device, such as the electronic device 102B. Further for explanatory purposes, the blocks of the process 400 are described herein as occurring in serial, or linearly. However, two or more blocks of the process 400 may occur in parallel. In addition, the blocks of the process 400 need not be performed in the order shown and/or one or more blocks of the process 400 need not be performed and/or can be replaced by other operations. One or more additional operations also can be performed.

In the process 400, the cellular circuit 204 receives, from the Wi-Fi circuit 206, an indication of a start of a Wi-Fi priority reception/transmission (402). For example, the Wi-Fi circuit 206 may transmit a coexistence signal over the interface 208 with a bit set to indicate the start of the Wi-Fi priority reception/transmission. The Wi-Fi priority reception/transmission may be, for example, a time-of-flight (or ToF) signal exchange. For example, the Wi-Fi circuit 206 of the electronic device 102A may negotiate a direct ToF signal exchange with another device, such as the electronic device 102B. However, the Wi-Fi circuit 206 may not transmit the indication of the Wi-Fi priority reception/transmission to the cellular circuit 204 until the ToF signal exchange is about to begin. Thus, the Wi-Fi circuit 206 may not transmit the indication of the Wi-Fi priority reception/transmission to the cellular circuit 204 until after the Wi-Fi circuit 206 transmits a request to send (RTS) message, or after the Wi-Fi circuit 206 receives a clear to send (CTS) message.

Upon receipt of the indication of the start of the Wi-Fi priority reception/transmission (402), the cellular circuit 204 determines whether one or more initial cellular blanking factor(s) are satisfied by a current state of the cellular circuit 204 (404). For example, the cellular circuit 204 determines the transmission power level associated with any current cellular activity. If the transmission power level is above a threshold level, such as, for example, −8 dBm, then the initial cellular blanking factor(s) may be satisfied. Alternatively, or in addition, in the case of out-of-band interference, the initial cellular blanking factor(s) may be satisfied if the number of resource blocks being transmitted by the cellular circuit 204 exceeds a threshold amount.

If the initial cellular blanking factor(s) are not satisfied (404), the cellular circuit 204 may bypass blanking its power amplifier (406). If the initial cellular blanking factor(s) are satisfied (404), the cellular circuit 204 may blank its power amplifier (408). If the cellular circuit 204 receives an indication from the Wi-Fi circuit 206 of the end of the Wi-Fi priority reception/transmission (410), the cellular circuit 204 unblanks its power amplifier (414) and resumes cellular transmissions.

In one or more implementations, the cellular circuit 204 may not notify the upper layers that its power amplifier has been blanked, and therefore packets, such as voice packets, may effectively be dropped while the power amplifier is being blanked (although packets may still be received). Thus, while the power amplifier of the cellular circuit 204 is being blanked, the cellular circuit 204 may continually or periodically confirm that one or more continuing cellular blanking factor(s) are satisfied by the current state of the cellular circuit 204. If the cellular circuit 204 determines that the one or more continuing cellular blanking factor(s) are satisfied by the current state of the cellular circuit 204, the cellular circuit 204 may continue to blank its power amplifier (408). However, if the cellular circuit 204 determines that the one or more continuing cellular blanking factor(s) are not satisfied by the current state of the cellular circuit 204 (412), the cellular circuit 204 may unblank its power amplifier and resume cellular transmissions (414).

In one or more implementations, the one or more continuing cellular blanking factors may not be satisfied when a number of continuous subframes that have been denied transmission due to the power amplifier of the cellular circuit 204 being blanked exceeds a threshold value and/or when a number of subframes within a time window that have been denied transmission due to the power amplifier being blanked exceeds a threshold number.

In one or more implementations, the cellular circuit 204 and/or the coex manager 203 may communicate (continuously or periodically) all of the currently in-use cellular frequencies to the Wi-Fi circuit 206, such as over the interface 208. In one or more other implementations, the cellular circuit 204 may only communicate the currently in-use cellular frequencies when one of the cellular frequencies could potentially degrade or interfere with a Wi-Fi channel, such as a channel in the 2.4 GHz band.

For example, the cellular circuit 204 and/or the coex manager 203 may transmit, to the Wi-Fi circuit 206, an indication of a wireless technology (e.g. LTE or WCDMA), an aggressor frequency, for each uplink carrier, an uplink center frequency and an uplink bandwidth, and for each downlink carrier, a downlink center frequency and a downlink bandwidth. The Wi-Fi circuit 206 may store the received information for debugging purposes, e.g., should the time-of-flight signal exchange be interfered with.

The Wi-Fi circuit 206 may receive the in-use cellular frequencies and determine whether a channel being used, e.g., for the ToF signal exchange (e.g. Wi-Fi channel 6), can be changed to a channel that is not interfered with or degraded by the cellular transmission of the cellular circuit 204. If the Wi-Fi circuit 206 determines the channel being used for the ToF signal exchange can be changed to a channel that is not interfered with or degraded by the cellular circuit 204, the Wi-Fi circuit 206 may change the channel used for the ToF signal exchange and may bypass notifying the cellular circuit 204 of the start/end of the priority Wi-Fi transmission.

Figure 5:
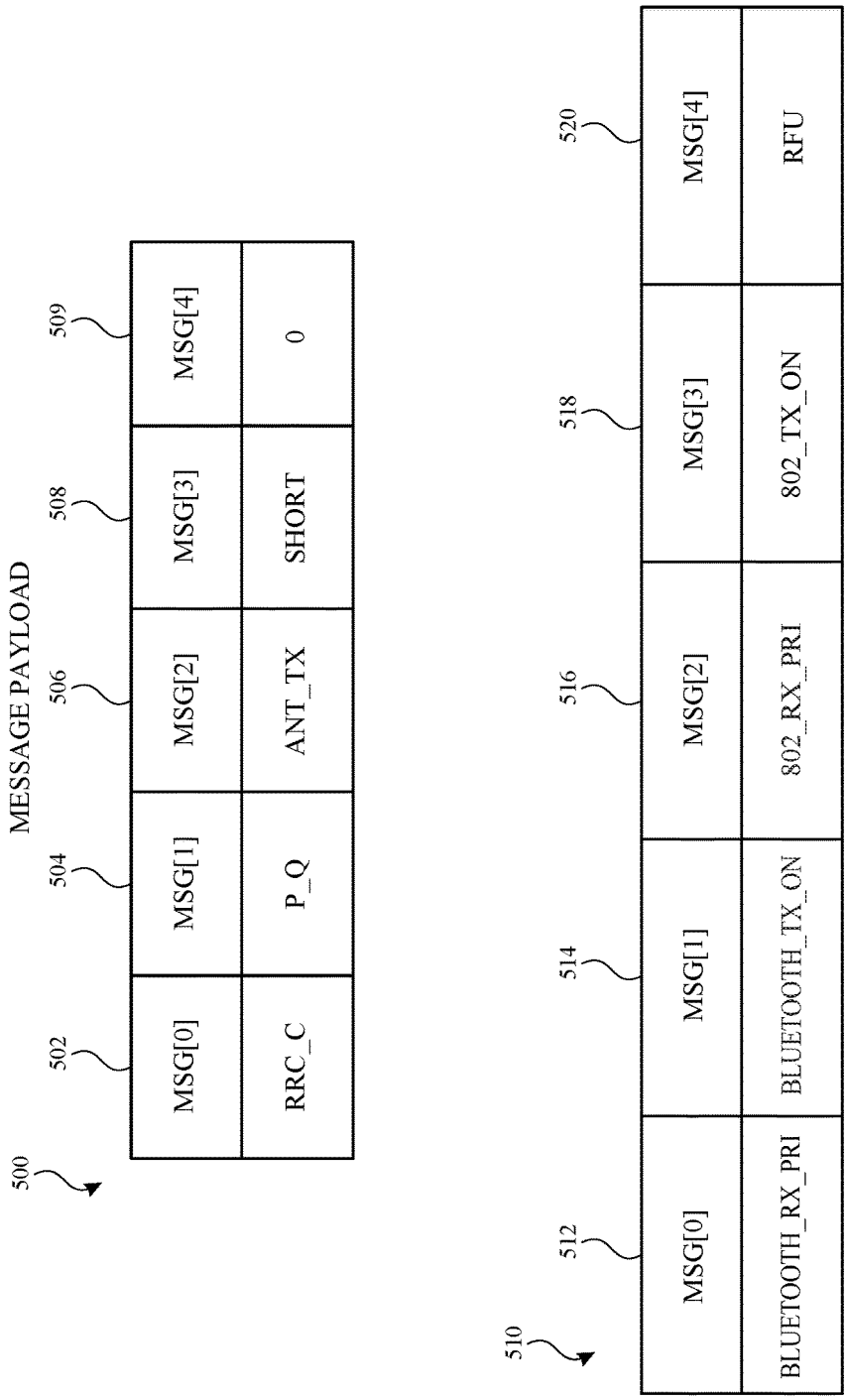
FIG. 5 illustrates an example of payload formats for coexistence messages in accordance with one or more implementations.

FIG. 5 illustrates example payload formats 500, 510 for coexistence signaling in accordance with one or more implementations. Not all of the depicted fields may be used in all implementations, however, and one or more implementations may include additional or different fields than those shown in the figure. Variations in the arrangement and type of the fields may be made without departing from the spirit or scope of the claims as set forth herein. Additional fields, different fields, or fewer fields may be provided.

The example payload format 500 may be a Wireless Coexistence Interface (WCI-2) Type 7 message that has been updated to define a state of the cellular circuit 204 via a radio resource control bit 502 and a short bit 508. The example payload format includes a radio resource control bit 502 that indicates whether the radio resource control is connected (e.g., a value of "1"), or is disconnected or idle (e.g., a value of "0"). The example payload format 500 further includes legacy bits 504, 506, 509, as well as a short bit 508 that indicates whether the cellular activity is characterized as short (e.g., a value of "1"), or as long/anything other than short (e.g., a value of "0"). The payload format 500 is only exemplary and other payload formats also can be devised to convey at least the same or similar information.

Thus, the combination of the radio resource control bit 502 and the short bit 508 provides for defining four different states of the cellular circuit 204, which are discussed further below with respect to FIG. 6.

The example payload format 510 may be a Wireless Coexistence Interface (WCI-2) message that is used by the Wi-Fi circuit 206 to transmit an indication of a priority reception to the cellular circuit 204. The payload format includes a Bluetooth priority reception field 512, a Bluetooth transmission active field 514, a Wi-Fi priority reception field 516, a Wi-Fi transmission active field 518, and a request for update field 520. The payload format 510 also is only exemplary and other payload formats also can be devised to convey at least the same or similar information.

FIG. 6 illustrates a table 600 listing different cellular states 602A-D when coexistence messages are communicated in accordance with one or more implementations. Each of the cellular states 602A-D is defined by a combination of the radio resource control bit 502 and the short bit 508.

For example, when the cellular circuit 204 has initiated a cellular signaling procedure with the cellular base station 105 (602A) (and/or when the signaling procedure is initiated by the cellular base station 105), the cellular circuit 204 transmits a coexistence message to the Wi-Fi circuit 206 over the interface 208 with the radio resource control bit 502 set to "1" and the short bit 508 set to "1", to reflect that the cellular signaling procedures, which are characterized as short cellular activity, have been initiated. When the cellular circuit 204 initiates a radio resource control connection with the cellular base station 105 for signaling only, the cellular circuit 204 does not indicate to the cellular base station 105 that it also has data to transmit. The cellular base station 105 may use this as a trigger to release the radio resource control connection as soon as the signaling procedure is complete, rather than waiting for an inactivity timer to expire, which could take, for example, 10 seconds.

As is discussed further above, when the Wi-Fi circuit 206 receives the coexistence message indicating that the short cellular activity has started, the Wi-Fi circuit 206 blanks its power amplifier to stop any current frame being transmitted, blocks transmission of subsequent (future) data frames, unblanks the power amplifier, sends a request to the Wi-Fi access point 104 to enter a power save mode, and notifies the Wi-Fi manager 205 of the short cellular activity. The Wi-Fi manager 205 requests the Wi-Fi driver to discard packets (instead of providing packets for transmission), but does not inform the upper layers that the Wi-Fi link is not presently transmitting packets. The Wi-Fi manager 205 further allows for requests for active scans, such as for location and/or positioning applications.

When the cellular signaling procedure has ended (602B), the cellular circuit 204 transmits a coexistence message to the Wi-Fi circuit 206 over the interface 208 with the radio resource control bit 502 set to "0" and the short bit 508 set to "1", to reflect that the cellular signaling procedures have completed, but the radio resource control connection has not been released. As is discussed further above, when the Wi-Fi circuit 206 receives the coexistence message indicating that the cellular signaling procedures have completed, but the radio resource control connection has not been released, the Wi-Fi circuit 206 exists the power save mode with the Wi-Fi access point 104, resumes Wi-Fi transmissions at a capped power level, and notifies the Wi-Fi manager 205 that the cellular signaling procedure has completed. The Wi-Fi manager 205 notifies the Wi-Fi driver to no longer discard packets and re-associates with the Wi-Fi access point 104, if needed.

If user plane activity, such as a voice call, occurs before the radio resource control connection is released (602C), the cellular circuit 204 transmits a coexistence message to the Wi-Fi circuit 206 over the interface 208 with the radio resource control bit 502 set to "1" and the short bit 508 set to "0", to reflect that long cellular activity has started. In one or more implementations, the cellular circuit 204 transmits a coexistence message to the Wi-Fi circuit 206 over the interface 208 with the radio resource control bit 502 set to "1" and the short bit set to "0", to reflect that a long cellular activity has started, e.g., not only long activity that occurs while waiting for a radio resource control connection to be released.

If the cellular circuit 204 initiates a voice call when Wi-Fi connectivity is available via the Wi-Fi circuit 206, the cellular circuit 204 does not advertise the availability of the Internet public data network (PDN) over the cellular circuit 204. Thus, the cellular circuit 204 is not provided as an alternate route for data during and/or immediately after a voice call.

As is discussed further above, when the Wi-Fi circuit 206 receives the coexistence message indicating that the long cellular activity has started, the Wi-Fi circuit 206 blanks its power amplifier to stop any current frame being transmitted, blocks transmission of subsequent (future) data frames, unblanks the power amplifier, sends a request to the Wi-Fi access point 104, to enter a power save mode, notifies the Wi-Fi manager 205 of the long cellular activity, and makes a best effort to maintain an association with the Wi-Fi access point 104 while staying within predetermined power constraints, such as limit of 5% of the duty cycle (although other portions of the duty cycle or other such power constraints can be used in other implementations). The Wi-Fi manager 205 requests the Wi-Fi driver to discard packets (instead of providing packets for transmission), but does not inform the upper layers that the Wi-Fi link is not presently transmitting packets. The Wi-Fi manager further allows for requests for active scans, such as for location and/or positioning applications.

When the radio resource control connection is released (602D), the cellular circuit 204 transmits a coexistence message to the Wi-Fi circuit 206 over the interface 208 with the radio resource control bit 502 set to "0" and the short bit 508 set to "0", to reflect that the radio resource control connection has been released. As is discussed further above, when the Wi-Fi circuit 206 receives the coexistence message indicating that the radio resource control connection has been released, the Wi-Fi circuit 206 resumes Wi-Fi transmissions at a normal power level (and/or using otherwise allowable parameters) and notifies the Wi-Fi manager 205 that the radio resource control connection has been released. The Wi-Fi manager 205 notifies the Wi-Fi driver to no longer discard packets and re-associates with the Wi-Fi access point 104, if needed.

Figure 7:
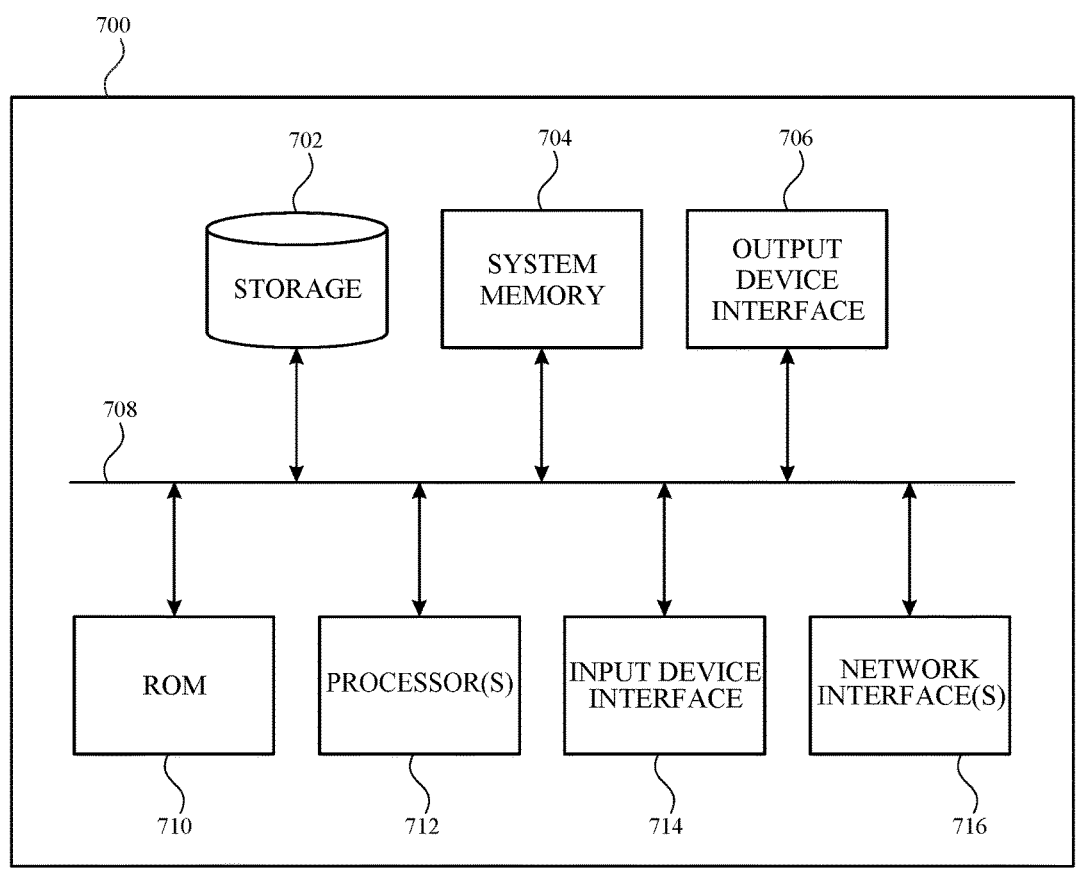
FIG. 7 conceptually illustrates an electronic system with which aspects of the subject technology may be implemented in accordance with one or more implementations.

FIG. 7 conceptually illustrates an electronic system 700 with which one or more implementations of the subject technology may be implemented. The electronic system 700 can be, and/or can be a part of, one or more of the electronic devices 102A-B, the Wi-Fi access point 104, and/or the cellular base station 105 shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving, from a collocated cellular circuit, a start indication for cellular activity associated with a radio resource control connection;
   responsive to receiving the start indication, stopping a Wi-Fi transmission capability; receiving, from the collocated cellular circuit, an end indication for the cellular activity prior to the radio resource control connection being released;
   resuming the Wi-Fi transmission capability in accordance with a reduced power level responsive to receiving the end indication; and
   resuming the Wi-Fi transmission capability in accordance with a normal power level responsive to receiving, from the collocated cellular circuit, a release indication for the radio resource control connection.

2. The method of claim 1, further comprising:
   receiving, from the collocated cellular circuit, a second start indication for the cellular activity after resuming the Wi-Fi transmission capability in accordance with the reduced power level and before resuming the Wi-Fi transmission capability in accordance with a normal power level; and
   responsive to receiving the second start indication for the cellular activity, stopping the Wi-Fi transmission capability in accordance with the reduced power level.

3. The method of claim 1, further comprising:
   receiving, from the collocated cellular circuit, an indication of a channel utilized for the cellular activity prior to stopping the Wi-Fi transmission capability; and
   stopping the Wi-Fi transmission capability irrespective of whether the Wi-Fi transmission capability will interfere with the cellular activity on the channel.

4. The method of claim 3, wherein the Wi-Fi transmission capability utilizes an other channel that does not interfere with the channel utilized for the cellular activity.

5. The method of claim 1, wherein stopping the Wi-Fi transmission capability comprises:
   blanking a power amplifier used for the Wi-Fi transmission capability;
   blocking transmission of one or more subsequent data frames associated with the Wi-Fi transmission capability;
   unblanking the power amplifier responsive to blocking the transmission of the one or more subsequent data frames; and
   transmitting a power save mode indication to an access point subsequent to unblanking the power amplifier.

6. The method of claim 5, wherein, when the start indication for the cellular activity characterizes an estimated duration of the cellular activity as being long, the method further comprises:

after unblanking the power amplifier, maintaining association with the access point while operating in accordance with a transmission power constraint.

7. The method of claim 5, wherein blocking the transmission of one or more subsequent data frames comprises: dropping the one or more subsequent data frames.

8. The method of claim 5, wherein blocking the transmission of one or more subsequent data frames comprises: blocking the transmission of the one or more subsequent data frames while allowing transmission of a frame associated with an active scanning operation or a Wi-Fi ranging operation.

9. A device comprising:
at least one cellular circuit configured to:
receive, from a collocated Wi-Fi circuit, a start indication for a Wi-Fi priority reception;
determine whether an initial cellular blanking factor is satisfied by a current state of the at least one cellular circuit;
when the initial cellular blanking factor is satisfied, stop a cellular transmission capability responsive to receipt of the start indication for the Wi-Fi priority reception, otherwise maintain the cellular transmission capability during the Wi-Fi priority reception; and
when the cellular transmission capability is stopped responsive to receipt of the start indication for the Wi-Fi priority reception, resume the cellular transmission capability responsive to receipt, from the collocated Wi-Fi circuit, of an end indication for the Wi-Fi priority reception.

10. The device of claim 9, wherein the at least one cellular circuit is further configured to:
determine whether a transmission power associated with the cellular circuit exceeds a threshold level to determine whether the initial cellular blanking factor is satisfied by the current state of the cellular circuit.

11. The device of claim 9, wherein the at least one cellular circuit is further configured to:
while the cellular transmission capability is stopped, determine whether a continuing cellular blanking factor is satisfied by the current state of the at least one cellular circuit based at least in part on a number of frames that have been denied transmission while the cellular transmission capability has been stopped; and
resume the cellular transmission capability when the continuing cellular blanking factor is not satisfied by the current state of the at least one cellular circuit irrespective of whether the end indication for the Wi-Fi priority reception has been received.

12. The device of claim 9, wherein the Wi-Fi priority reception comprises a time of flight signal exchange, and the start indication for the Wi-Fi priority reception is received when a request to send (RTS) message is transmitted by the collocated Wi-Fi circuit for the time of flight signal exchange.

13. The device of claim 12, wherein the end indication for the Wi-Fi priority reception is transmitted by the collocated Wi-Fi circuit after an exchange of timing measurements collected during the time of flight signal exchange.

14. The device of claim 9, wherein the at least one cellular circuit is further configured to:
disable a power amplifier that is used for the cellular transmission capability to stop the cellular transmission capability; and
enable the power amplifier used for the cellular transmission capability to resume the cellular transmission capability.

15. A system comprising:
at least one host processor;
at least one cellular circuit configured to:
establish a radio resource control connection with a cellular base station for cellular activity without indicating that data will be transmitted;
begin the cellular activity and transmit, to at least one Wi-Fi circuit, a start indication for the cellular activity;
complete the cellular activity and transmit, to the at least one Wi-Fi circuit, an end indication for the cellular activity; and
responsive to determining that the radio resource control connection with the cellular base station has been released, transmitting, to the at least one Wi-Fi circuit, a release indication for the radio resource control connection; and
the at least one Wi-Fi circuit that is communicatively coupled to the at least one cellular circuit and is configured to:
responsive to receipt of the start indication for the cellular activity, stop a Wi-Fi transmission capability irrespective of whether the Wi-Fi transmission capability interferes with the cellular activity;
resume the Wi-Fi transmission capability in accordance with a reduced power level responsive to receipt of the end indication for the cellular activity; and
resume the Wi-Fi transmission capability in accordance with a normal power level responsive to receipt of the release indication for the radio resource control connection.

16. The system of claim 15, wherein the at least one host processor is further configured to provide a Wi-Fi manager that is configured to notify a Wi-Fi driver to discard packets responsive to a notification of the same from the at least one Wi-Fi circuit, and the at least one Wi-Fi circuit is further configured to, responsive to receipt of the start indication for the cellular activity:
blank a power amplifier of the at least one Wi-Fi circuit to stop the Wi-Fi transmission capability;
notify the Wi-Fi manager of the host processor to request that the Wi-Fi driver discard the packets;
unblank the power amplifier; and
transmit a request to enter a power save mode to a Wi-Fi access point.

17. The system of claim 16, wherein the at least one Wi-Fi circuit is further configured to, responsive to receipt of the end indication for the cellular activity:
transmit a request to exit the power save mode to the Wi-Fi access point; and
notify the Wi-Fi manager of the host processor to request that the Wi-Fi driver stop discarding the packets.

18. The system of claim 15, wherein:
the at least one Wi-Fi circuit is further configured to:
transmit a request to send message (RTS) and receive a clear to send message (CTS) for a time of flight signal exchange with an other device;
responsive to reception of the clear to send message, transmit, to the at least one cellular circuit, a start indication for a Wi-Fi priority reception;
participate in the time of flight signal exchange;
transmit, to the at least one cellular circuit, an end indication for the Wi-Fi priority reception, responsive to completing the time of flight signal exchange and before exchanging timing measurements obtained during the time of flight signal exchange; and exchange the timing measurements obtained during the time of flight signal exchange with the other device after transmission, to the at least one cellular circuit, of the end indication for the Wi-Fi priority reception; and the at least one cellular circuit is further configured to:
receive the start indication for the Wi-Fi priority reception;
when an initial cellular blanking factor is satisfied by a current state of the at least one cellular circuit, blanking a power amplifier of the at least one cellular circuit responsive to receipt of the start indication for the Wi-Fi priority reception; and
unblank the power amplifier of the at least one cellular circuit responsive to receipt of the end indication for the Wi-Fi priority reception or when a continuing cellular blanking factor is not satisfied by the current state of the at least one cellular circuit.

19. The system of claim 18, wherein:
the at least one cellular circuit is further configured to:
transmit, to the at least one Wi-Fi circuit, an indication of a frequency being used for the cellular activity; and
the at least one Wi-Fi circuit is further configured to:
select a different channel for the time of flight signal exchange when the cellular activity using the indicated frequency will interfere with the time of flight signal exchange; and
bypass transmission of the start and end indications for the Wi-Fi priority reception responsive to a selection of the different channel for the time of flight signal exchange.

* * * * *